(12) United States Patent
Lin et al.

(10) Patent No.: US 11,686,139 B2
(45) Date of Patent: Jun. 27, 2023

(54) HINGE STRUCTURE

(71) Applicants: Che-Hsien Lin, Taipei (TW); Ko-Yen Lu, Taipei (TW)

(72) Inventors: Che-Hsien Lin, Taipei (TW); Ko-Yen Lu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 140 days.

(21) Appl. No.: 16/950,912

(22) Filed: Nov. 18, 2020

(65) Prior Publication Data
US 2022/0065012 A1 Mar. 3, 2022

Related U.S. Application Data

(60) Provisional application No. 63/073,403, filed on Sep. 1, 2020.

(51) Int. Cl.
*E05D 11/08* (2006.01)
*E05D 5/14* (2006.01)
*E05D 11/10* (2006.01)

(52) U.S. Cl.
CPC ............. *E05D 11/082* (2013.01); *E05D 5/14* (2013.01); *E05D 11/1007* (2013.01); *E05D 2005/145* (2013.01)

(58) Field of Classification Search
CPC .... E05D 2005/145; E05D 11/082; E05D 5/14
USPC ........................................................ 16/342
See application file for complete search history.

(56) References Cited

U.S. PATENT DOCUMENTS

| 5,697,125 | A * | 12/1997 | Gannon | ................ | E05D 11/082 16/342 |
| 6,170,120 | B1 * | 1/2001 | Lu | ......................... | G06F 1/1616 16/337 |
| 6,256,838 | B1 * | 7/2001 | Lu | ......................... | G06F 1/1616 16/337 |
| 6,301,748 | B1 * | 10/2001 | Su-Man | ................ | G06F 1/1616 16/337 |
| 6,467,129 | B1 * | 10/2002 | Bae | ....................... | G06F 1/1616 16/337 |
| 6,775,884 | B2 * | 8/2004 | Su-Man | ................ | G06F 1/1616 16/342 |

(Continued)

FOREIGN PATENT DOCUMENTS

TW      M606328      1/2021

*Primary Examiner* — Jeffrey O'Brien
(74) *Attorney, Agent, or Firm* — JCIPRNET (57) ABSTRACT

A hinge structure includes: a base having an axial hole whose an inner wall has positioning concave portions; at least one torque element, disposed in the axial hole and includes a torque providing portion and positioning convex portions; and a rotation shaft, passing through the through hole. The torque providing portion surrounds a central axis of the axial hole to form a through hole, the torque providing portion has a fracture adjacent to the through hole, and the positioning convex portions are connected to the torque providing portion and correspond to the positioning concave portions respectively. The torque providing portion and the positioning convex portions are located on a same virtual plane perpendicular to the center axis. A first virtual straight line on the virtual plane passes through the fracture and the center axis, and at least some positioning convex portions are not located on the first virtual straight line.

9 Claims, 6 Drawing Sheets

(56) References Cited

U.S. PATENT DOCUMENTS

| | | | | |
|---|---|---|---|---|
| 6,928,700 B2* | 8/2005 | Huong | ............ | G06F 1/1681 16/386 |
| 6,988,294 B2* | 1/2006 | Birtley | ............ | G06F 1/1616 16/337 |
| 7,124,473 B2* | 10/2006 | Lu | ............ | G06F 1/1681 16/337 |
| 7,178,200 B2* | 2/2007 | Kosako | ............ | E05D 11/082 348/E5.025 |
| 7,257,863 B2* | 8/2007 | Horng | ............ | E05D 11/084 16/342 |
| 7,451,522 B2* | 11/2008 | Lu | ............ | G06F 1/1681 16/342 |
| 7,451,523 B2* | 11/2008 | Chen | ............ | G06F 1/1681 16/342 |
| 7,607,202 B1* | 10/2009 | Lee | ............ | G06F 1/1616 16/342 |
| 7,958,600 B2* | 6/2011 | Kuo | ............ | G06F 1/1681 16/342 |
| 8,006,347 B2* | 8/2011 | Sue | ............ | G06F 1/1681 16/338 |
| 8,230,554 B2* | 7/2012 | Chu | ............ | E05D 11/087 16/337 |
| 8,245,356 B2* | 8/2012 | Chu | ............ | G06F 1/1681 16/342 |
| 8,448,297 B2* | 5/2013 | Chen | ............ | E05D 11/10 16/342 |
| 8,555,465 B2* | 10/2013 | Novin | ............ | E05D 3/02 16/342 |
| 8,752,727 B2* | 6/2014 | Niemann | ............ | B65D 51/04 220/822 |
| 8,875,348 B2* | 11/2014 | Kossett | ............ | G06F 1/1681 16/342 |
| 8,914,946 B2* | 12/2014 | Hsu | ............ | F16H 21/44 16/342 |
| 9,644,412 B2* | 5/2017 | Novin | ............ | E05D 3/02 |
| 9,790,720 B2* | 10/2017 | Jenum | ............ | E05D 5/128 |
| 9,964,988 B2* | 5/2018 | Rittenhouse | ............ | E05D 11/082 |
| 10,151,128 B2* | 12/2018 | Hatano | ............ | E05D 3/12 |
| 10,267,075 B2* | 4/2019 | Kenyon | ............ | E05D 3/02 |
| 2002/0042970 A1* | 4/2002 | Liao | ............ | G06F 1/1616 16/337 |
| 2002/0043002 A1* | 4/2002 | Liao | ............ | G06F 1/1681 33/495 |
| 2002/0144378 A1* | 10/2002 | Liao | ............ | G06F 1/1681 16/342 |
| 2002/0162192 A1* | 11/2002 | Su-Man | ............ | G06F 1/1681 16/337 |
| 2003/0000046 A1* | 1/2003 | Liao | ............ | G06F 1/1616 16/307 |
| 2003/0041413 A1* | 3/2003 | Huong | ............ | G06F 1/1616 16/338 |
| 2004/0098833 A1* | 5/2004 | Lu | ............ | H04M 1/0216 16/336 |
| 2006/0032022 A1* | 2/2006 | Minami | ............ | E05D 11/087 16/342 |
| 2006/0213030 A1* | 9/2006 | Lu | ............ | G06F 1/1616 16/221 |
| 2006/0282985 A1* | 12/2006 | Lu | ............ | G06F 1/1679 16/367 |
| 2007/0050943 A1* | 3/2007 | Chiu | ............ | G06F 1/1681 16/342 |
| 2007/0079477 A1* | 4/2007 | Huang | ............ | H05K 5/0226 16/342 |
| 2007/0094845 A1* | 5/2007 | Chang | ............ | G06F 1/1616 16/342 |
| 2007/0101543 A1* | 5/2007 | Lu | ............ | G06F 1/1681 16/342 |
| 2007/0283534 A1* | 12/2007 | Chang | ............ | G06F 1/1681 16/342 |

* cited by examiner

HINGE STRUCTURE

CROSS-REFERENCE TO RELATED APPLICATION

This application claims the priority benefit of U.S. provisional application Ser. No. 63/073,403, filed on Sep. 1, 2020. The entirety of the above-mentioned patent application is hereby incorporated by reference herein and made a part of this specification.

BACKGROUND OF THE INVENTION

1. Field of the Invention

The disclosure relates to a hinge structure, and particularly to a hinge structure including a torque element.

2. Description of Related Art

Figure 1:
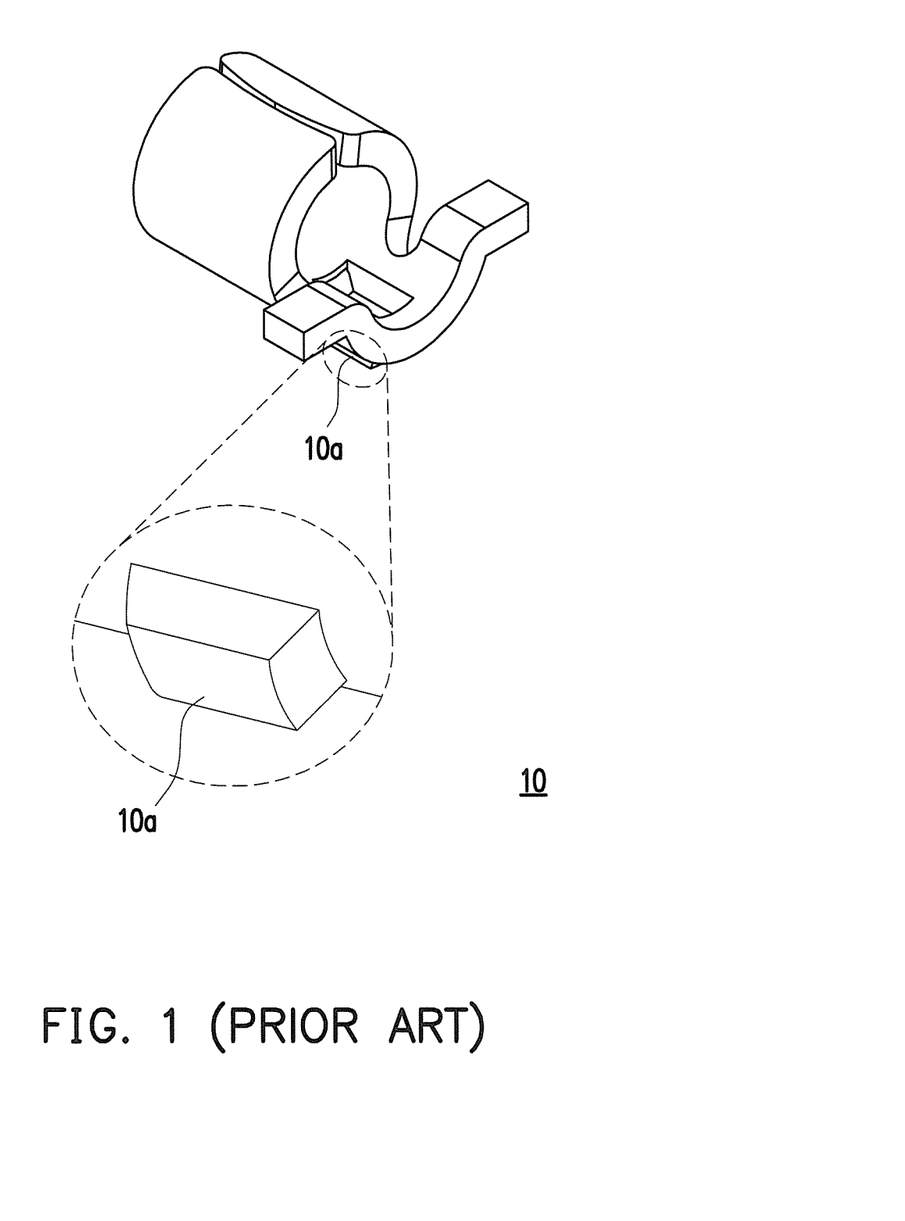
FIG. 1 illustrates a conventional torque element.

With the advancement of wireless transmission and image capture technologies, small-scale image capturing devices have gradually become popular in the consumer market. In order to enable a lens of the image capturing device to rotate, the lens is generally pivoted to a base through a hinge structure. However, with the image capturing device being miniaturized, the volume of the hinge structure of the image capturing device is correspondingly reduced so it is difficult to provide sufficient internal space for a torque element of the hinge structure to be assembled by screw-locking. Regarding this, a torque element of the conventional hinge structure (as shown in FIG. 1) is designed to be formed by a rolling process, and then a positioning convex portion 10a in the form of a convex hull is formed, as a positioning point for assembling, on a torque element 10 by forming a convex (or called embossing). However, in the positioning convex portion 10a formed by the rolling process together with convex forming, the convex may be deviated, and may be prone to stress concentration. Therefore, when the torque element 10 is combined with a rotation shaft and deformed by a force, a crack may be formed easily at the position where the stress concentrates in the positioning convex portion 10a, resulting in a structural damage and a loss of torque.

SUMMARY OF THE INVENTION

The disclosure provides a hinge structure, which may save a configuration space of a torque element and allow the torque element to have a higher structural strength.

A hinge structure according to the disclosure includes a base, at least one torque element and a rotation shaft. The base has an axial hole, and an inner wall of the axial hole has a plurality of positioning concave portions. The torque element is disposed in the axial hole and includes a torque providing portion and a plurality of positioning convex portions. The torque providing portion surrounds a central axis of the axial hole to form a through hole, and the torque providing portion has a fracture adjacent to the through hole. The positioning convex portions are connected to the torque providing portion and configured to correspond to the positioning concave portions. The torque providing portion and the positioning convex portions are located on a same virtual plane, and the virtual plane is perpendicular to the central axis. A first virtual straight line on the virtual plane passes through the fracture and the central axis, and at least some of the positioning convex portions are not located on the first virtual straight line. The rotation shaft passes through the through hole.

In an embodiment of the disclosure, at least some of the aforementioned positioning convex portions are respectively located on opposite sides with respect to the first virtual straight line.

In an embodiment of the disclosure, the aforementioned positioning convex portions are symmetrical with respect to the first virtual straight line.

In an embodiment of the disclosure, the two aforementioned positioning convex portions are respectively located on opposite sides with respect to the first virtual straight line, and extending directions of the two positioning convex portions are perpendicular or inclined to the first virtual straight line.

In an embodiment of the disclosure, a second virtual straight line on the aforementioned virtual plane is perpendicular to the first virtual straight line and passes through the central axis. The fracture is located on one side with respect to the second virtual straight line, and the positioning convex portions are located on the other side with respect to the second virtual straight line.

In an embodiment of the disclosure, a distance between a first part of the aforementioned torque providing portion and the fracture is greater than a distance between a second part of the torque providing portion and the fracture. A width of the first part along a radial direction of the through hole is greater than a width of the second part along the radial direction of the through hole.

In an embodiment of the disclosure, a dimension of the at least one aforementioned torque element along an axial direction of the through hole is smaller than the dimension of the at least one aforementioned torque element along a radial direction of the through hole.

In an embodiment of the disclosure, the number of the at least one aforementioned torque element is plural, and the torque elements are stacked in sequence along a direction of the central axis.

In an embodiment of the disclosure, the aforementioned torque providing portion deforms elastically by the rotation shaft passing through the through hole to allow the positioning convex portions to respectively correspond to the positioning concave portions.

In an embodiment of the disclosure, each of the aforementioned positioning convex portions extends into a corresponding one of the positioning concave portions along a radial direction of the axial hole.

To sum up, in the disclosure, the torque element is fixed through the mutual cooperation between the positioning convex portion of the torque element and the positioning concave portion of the base to fix the torque element. Therefore, there is no need to assemble the torque element inside the hinge structure by screw locking. Thus, the configuration space of the torque element may be saved. Furthermore, in the torque element of the disclosure, the torque providing portion and the positioning convex portion are coplanar, which allows the entire torque element to be directly formed by punching. Therefore, there is no need to form the positioning convex portions in the form of convex hulls by forming a convex, which may prevent the torque element from forming the cracks due to the stress concentration at the positioning convex portion. That is, the structural strength of the torque element is reinforced. In addition, the number of positioning convex portion of the torque element is plural to provide the positioning convex portions respectively located on the left and right sides of the torque providing portion. Therefore, the force received by the torque element is uniform, and a stable structure is provided.

DESCRIPTION OF THE EMBODIMENTS

Figure 2:
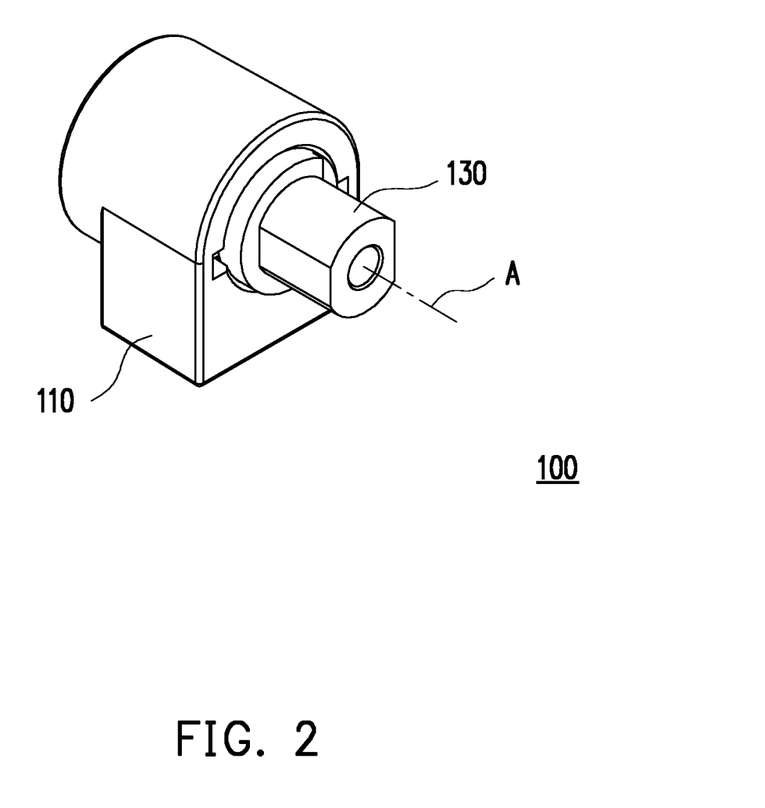
FIG. 2 is a perspective view of a hinge structure according to an embodiment of the disclosure.
Figure 3:
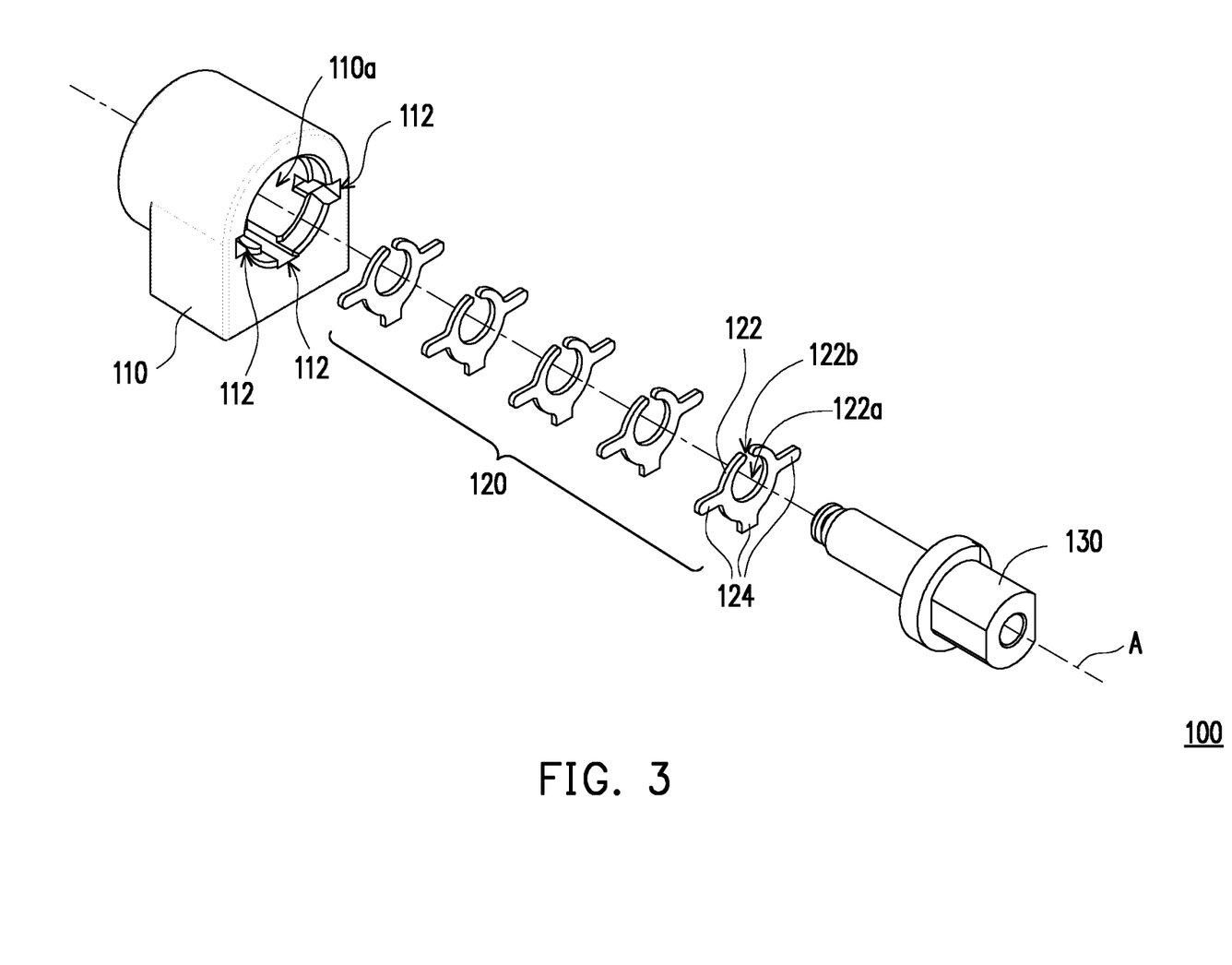
FIG. 3 is an exploded view of the hinge structure of FIG. 2.
Figure 4:
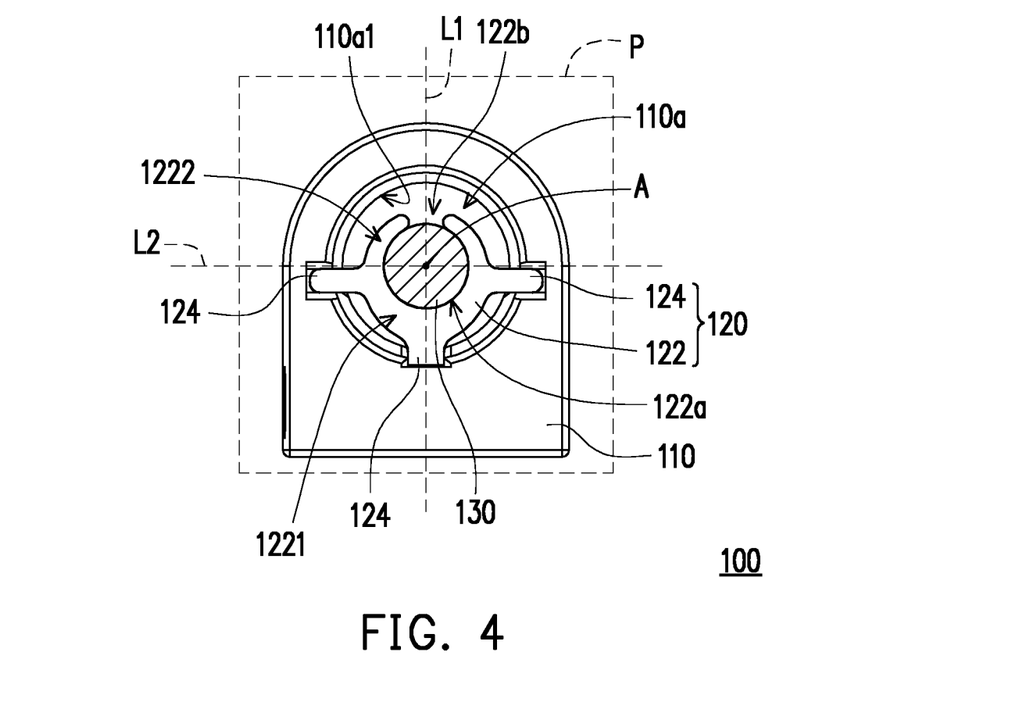
FIG. 4 illustrates some components of the hinge structure of FIG. 2.

FIG. 2 is a perspective view of a hinge structure according to an embodiment of the disclosure. FIG. 3 is an exploded view of the hinge structure of FIG. 2. FIG. 4 illustrates some components of the hinge structure of FIG. 2 viewed along an axial direction of the hinge structure. With reference to FIGS. 2 to 4, a hinge structure 100 of the embodiment includes a base 110, at least one torque element 120 (a plurality of torque elements are illustrated in FIG. 3), and a rotation shaft 130. The base 110 has an axial hole 110a. The torque elements 120 are disposed in the axial hole 110a of the base 110 and are stacked in sequence along a direction of a central axis A of the axial hole 110a. The rotation shaft 130 passes through the torque elements 120 to provide a required torque of the hinge structure 100 by the friction between the rotation shaft 130 and the torque elements 120.

Figure 5:
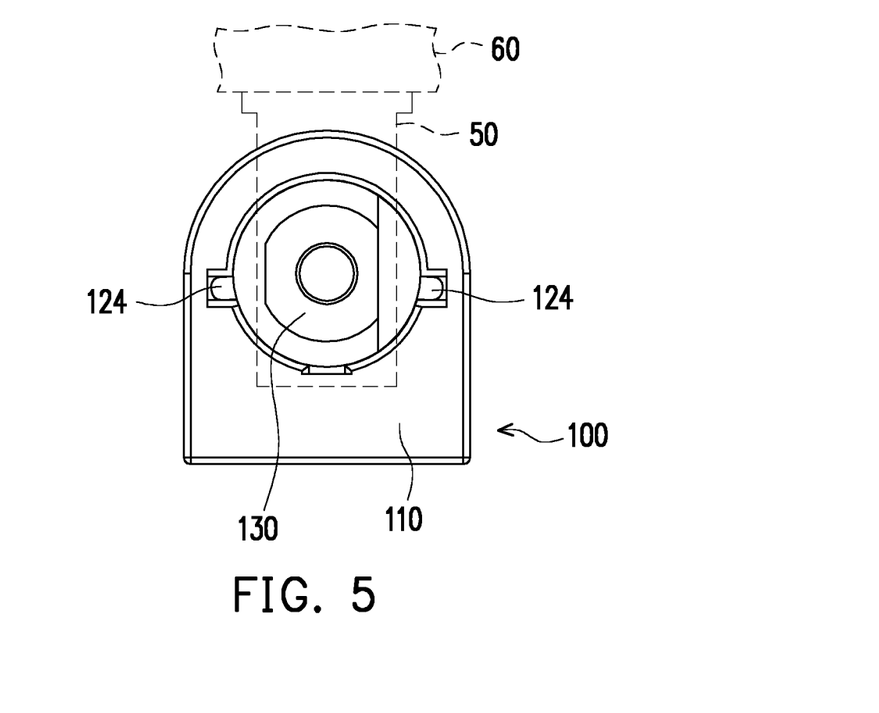
FIG. 5 illustrates the hinge structure of FIG. 2 applied to an image capturing device.

FIG. 5 illustrates the hinge structure of FIG. 2 applied to an image capturing device. The rotation shaft 130 may be connected to a frame 50 as shown in FIG. 5, and an image capturing device 60 is assembled to the frame 50 and may rotate with the rotation shaft 130 relative to the base 110. In other embodiments, the hinge structure 100 may be applied to other types of devices, and the disclosure is not limited thereto.

With reference to FIG. 4, in detail, in the base 110 of the embodiment, an inner wall 110a1 of the axial hole 110a has a plurality of positioning concave portions 112 (as shown in FIG. 3). The torque element 120 is disposed in the axial hole 110a and includes a torque providing portion 122 and a plurality of positioning convex portions 124. The torque providing portion 122 surrounds the central axis A of the axial hole 110a to form a through hole 122a. The torque providing portion 122 has a fracture 122b adjacent to the through hole 122a. The rotation shaft 130 resists the elastic force of the torque providing portion 122 and passes through the through hole 122a. The positioning convex portions 124 are connected to the torque providing portion 122 and respectively extend into the positioning concave portions 112 of the base 110 along a radial direction of the axial hole 110a. Therefore, the positioning convex portions 124 respectively correspond to the positioning concave portions 112.

In the hinge structure 100 of the embodiment as described above, the positioning convex portions 124 of the torque element 120 cooperate with the positioning concave portions 112 of the base 110 to fix the torque element 120. Therefore, there is no need to assemble the torque element 120 inside the hinge structure 100 by screw locking, and the configuration space of the torque element 120 may be saved.

Furthermore, the torque providing portion 122 and the positioning convex portions 124 of the embodiment are located on a same virtual plane P (illustrated in FIG. 4), and the virtual plane P is perpendicular to the central axis A of the axial hole 110a. That is, in each of the torque elements 120, the torque providing portion 122 and the positioning convex portions 124 are coplanar, so that the entire torque element 120 may be directly formed by punching. Therefore, there is no need to form the positioning convex portions in the form of convex hulls by forming a convex. As a result, not only the manufacturing accuracy of the positioning convex portions 124 is increased, but also the torque element 120 is prevented from forming cracks due to stress concentration at the positioning convex portions. That is, the structural strength of the torque element 120 is reinforced. In addition, a first virtual straight line L1 on the virtual plane P passes through the fracture 122b of the torque providing portion 122 and the central axis A of the axial hole 110a. In one aspect, some of the positioning convex portions 124 are not located on the first virtual straight line L1, but may be respectively located on left and right opposite sides of the torque providing portion 122 and be symmetrical with respect to the first virtual straight line L1. That is, the positioning convex portions 124 are arranged in a pair and symmetrically located on the left and right sides of the torque providing portion 122 with the first virtual straight line L1 as a mirroring center, which may thereby allow the force received by the torque element 120 to be uniform and provide a stable structure. In addition, as shown in FIG. 3, in another aspect, one positioning convex portion 124 may be further arranged on the first virtual straight line L1, and the contour of the positioning convex portion 124 is also symmetrical with respect to the first virtual straight line L1. By using the positioning convex portion 124 in such arrangement with the pair of symmetrical positioning convex portions 124 together, the stability of the structure may be further reinforced.

Since each of the torque elements 120 is manufactured by punching as described above, the torque element 120 may be a sheet-like structure. That is, as shown in FIG. 3, a dimension (i.e., thickness) of each of the torque elements 120 along the axial direction of the through hole 122a is smaller than another dimension (i.e., width) of each of the torque elements 120 along the radial direction of the through hole 122a. In such a case, in order to provide sufficient torque, the plurality of torque elements 120 (five shown in FIG. 3) are disposed in sequence along the axial direction of the axial hole 110a in the embodiment. In other embodiments, the number of the torque element 120 may be other suitable numbers, and the disclosure is not limited thereto.

With reference to FIG. 4, a second virtual straight line L2 on the virtual plane P is perpendicular to the first virtual straight line L1 and passes through the central axis A of the axial hole 110a. The fracture 122b of the torque providing portion 122 is located on one side with respect to the second virtual straight line L2, and the positioning convex portions 124 are located on the other side with respect to the second virtual straight line L2. In this way, the positioning convex portions 124 are not too close to the fracture 122b, which may prevent the torque element 120 from being located too close to the fracture 122b to provide the required torque effectively.

Since each of the torque elements 120 is manufactured by punching as described above, parts of the structure of the torque element 120 may be easily provided with a greater width through punching, thereby reinforcing the structural strength. Specifically, the torque providing portion 122 includes a first part 1221 (labelled in FIG. 4) farther from the fracture 122b and a second part 1222 (labelled in FIG. 4) closer to the fracture 122b. That is, a distance between the first part 1221 and the fracture 122b is greater than a distance between the second portion 1222 and the fracture 122b. In addition, a width of the first part 1221 along the radial direction of the through hole 122a (as shown in FIG. 4) is greater than a width of the second part 1222 along the radial direction of the through hole 122a. That is, a radial width of the torque providing portion 122 is gradually reduced from the first portion 1221 toward the second part 1222, which provides the entire torque element 120 with a higher structural strength.

Figure 6A:
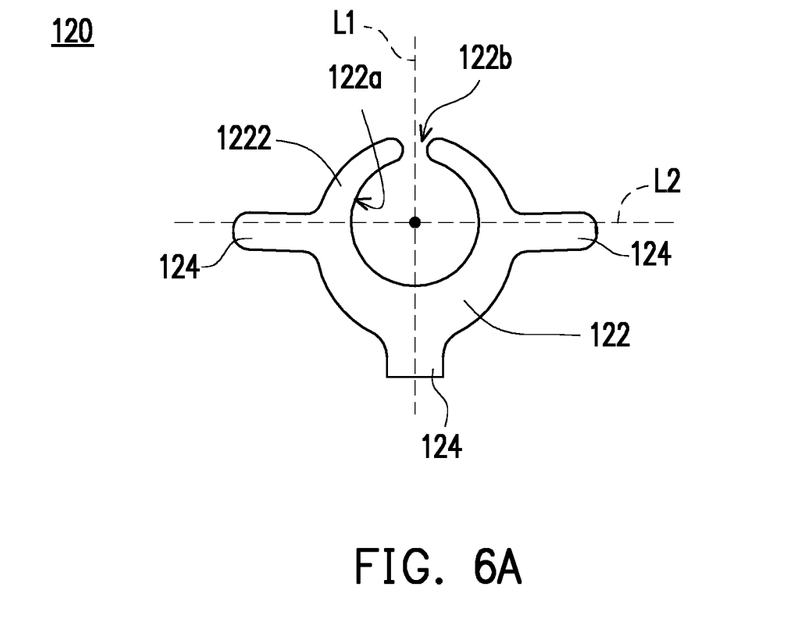
FIG. 6A illustrates that a torque element of FIG. 4 has not been combined with a rotation shaft.
Figure 6B:
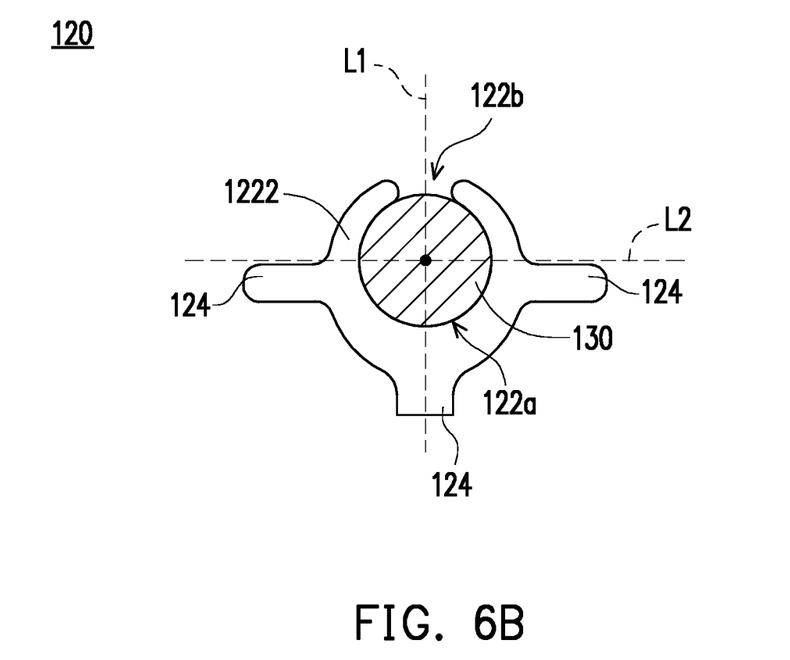
FIG. 6B illustrates that the torque element of FIG. 6A is combined with the rotation shaft.

FIG. 6A illustrates that the torque element of FIG. 4 has not been combined with the rotation shaft. FIG. 6B illustrates that the torque element of FIG. 6A is combined with the rotation shaft. As shown in FIGS. 6A and 6B, the torque providing portion 122 deforms elastically by the rotation shaft 130 passing through the through hole 122a. Accordingly, the positioning convex portions 124 are changed from the position shown in FIG. 6A to the position shown in FIG. 6B, and respectively correspond to the positioning concave portions 112 shown in FIG. 3. That is, when manufacturing the torque element 120 by punching, the position and angle changes of the positioning convex portions 124 resulting from the deformation after the torque element 120 is combined with the rotation shaft 130 should be taken into consideration to determine the initial shapes and positions of the torque element 120 and the positioning concave portions 112.

Figure 7:
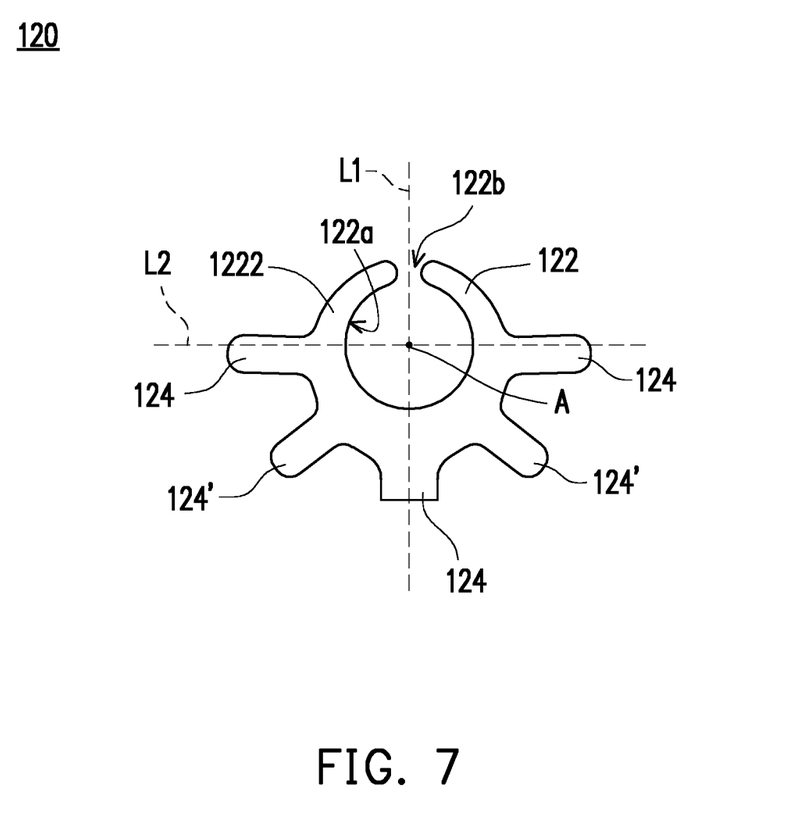
FIG. 7 illustrates a torque element according to another embodiment of the disclosure.

In the embodiment, the extending directions of the two positioning convex portions 124 respectively located on the opposite two sides with respect to the first virtual straight line L1 shown in FIG. 4 are perpendicular to the first virtual straight line L1. In other embodiments, a larger number of positioning convex portions may be disposed and have different extending directions. FIG. 7 illustrates a torque element according to another embodiment of the disclosure. A difference between the embodiment shown in FIG. 7 and the foregoing embodiments is that the torque element 120 of FIG. 7 further includes two positioning convex portions 124' respectively located on the opposite sides with respect to the first virtual straight line L1. The extending directions of the positioning convex portions 124' are inclined to the first virtual straight line L1. In addition, the positioning convex portions 124' and the fracture 122b are respectively located on the opposite sides with respect to the second virtual straight line L2. In this way, the positioning convex portions 124' are not too close to the fracture 122b, which may prevent the torque element 120 from being located too close to the fracture 122b to provide the required torque effectively.

To sum up, in the disclosure, the torque element is fixed through the mutual cooperation between the positioning convex portion of the torque element and the positioning concave portion of the base. Therefore, there is no need to assemble the torque element inside the hinge structure by screw locking. Thus, the configuration space of the torque element may be saved. Furthermore, in the torque element of the disclosure, the torque providing portion and the positioning convex portion are coplanar, which allows the entire torque element to be directly formed by punching. Therefore, there is no need to form the positioning convex portions in the form of convex hulls by forming a convex, which may prevent the torque element from forming the cracks due to the stress concentration at the positioning convex portion. That is, the structural strength of the torque element is reinforced. In addition, the number of positioning convex portions of the torque element is plural to provide the positioning convex portions respectively located on the left and right sides of the torque providing portion. Therefore, the force received by the torque element is uniform, and a stable structure is provided. In addition, the positioning convex portions may be disposed farther from the fracture to prevent the torque element from being located too close to the fracture to provide the required torque effectively.

What is claimed is:

1. A hinge structure, comprising:
a base having an axial hole, wherein an inner wall of the axial hole has a plurality of positioning concave portions;
at least one torque element disposed in the axial hole and comprising a torque providing portion and a plurality of positioning convex portions, wherein the torque providing portion surrounds a central axis of the axial hole to form a through hole, the torque providing portion has a fracture adjacent to the through hole, and the positioning convex portions are connected to the torque providing portion and configured to respectively correspond to the positioning concave portions, wherein the torque providing portion and the positioning convex portions are located on a same virtual plane, and the virtual plane is perpendicular to the central axis, a first virtual straight line on the virtual plane passes through the fracture and the central axis, at least some of the positioning convex portions are not located on the first virtual straight line, at least one of the positioning convex portions is located on the first virtual straight line, a distance between the at least some of the positioning convex portions and the fracture is smaller than a distance between the at least one of the positioning convex portions and the fracture, and a second virtual straight line on the virtual plane is perpendicular to the first virtual straight line and passes through the central axis, wherein a distance between the at least some of the positioning convex portions and the second virtual straight line is smaller than a distance between the at least some of the positioning convex portions and the at least one of the positioning convex portions; and
a rotation shaft passing through the through hole, and wherein
the fracture is located on one side with respect to the second virtual straight line, and the positioning convex portions are located on another side with respect to the second virtual straight line.

2. The hinge structure as recited in claim 1, wherein at least some of the positioning convex portions are respectively located on opposite sides with respect to the first virtual straight line.

3. The hinge structure as recited in claim 1, wherein the positioning convex portions are symmetrical with respect to the first virtual straight line.

4. The hinge structure as recited in claim 1, wherein two of the positioning convex portions are respectively located on opposite sides with respect to the first virtual straight line, and extending directions of two of the positioning convex portions are perpendicular or inclined to the first virtual straight line.

5. The hinge structure as recited in claim 1, wherein a distance between a first part of the torque providing portion and the fracture is greater than a distance between a second part of the torque providing portion and the fracture, and a width of the first part along a radial direction of the through hole is greater than a width of the second part along the radial direction of the through hole.

6. The hinge structure as recited in claim 1, wherein a dimension of the at least one torque element along an axial direction of the through hole is smaller than another dimension of the at least one torque element along a radial direction of the through hole.

7. The hinge structure as recited in claim 1, wherein a number of the at least one torque element is plural, and the torque elements are stacked in sequence in a direction along the central axis.

8. The hinge structure as recited in claim 1, wherein the torque providing portion deforms elastically by the rotation shaft passing through the through hole to allow the positioning convex portions to respectively correspond to the positioning concave portions.

9. The hinge structure as recited in claim 1, wherein each of the positioning convex portions extends into a corresponding one of the positioning concave portions along a radial direction of the axial hole.

* * * * *